Jan. 25, 1927.
C. F. COWDREY
1,615,798
PEDAL DEPRESSOR
Filed Feb. 2, 1925
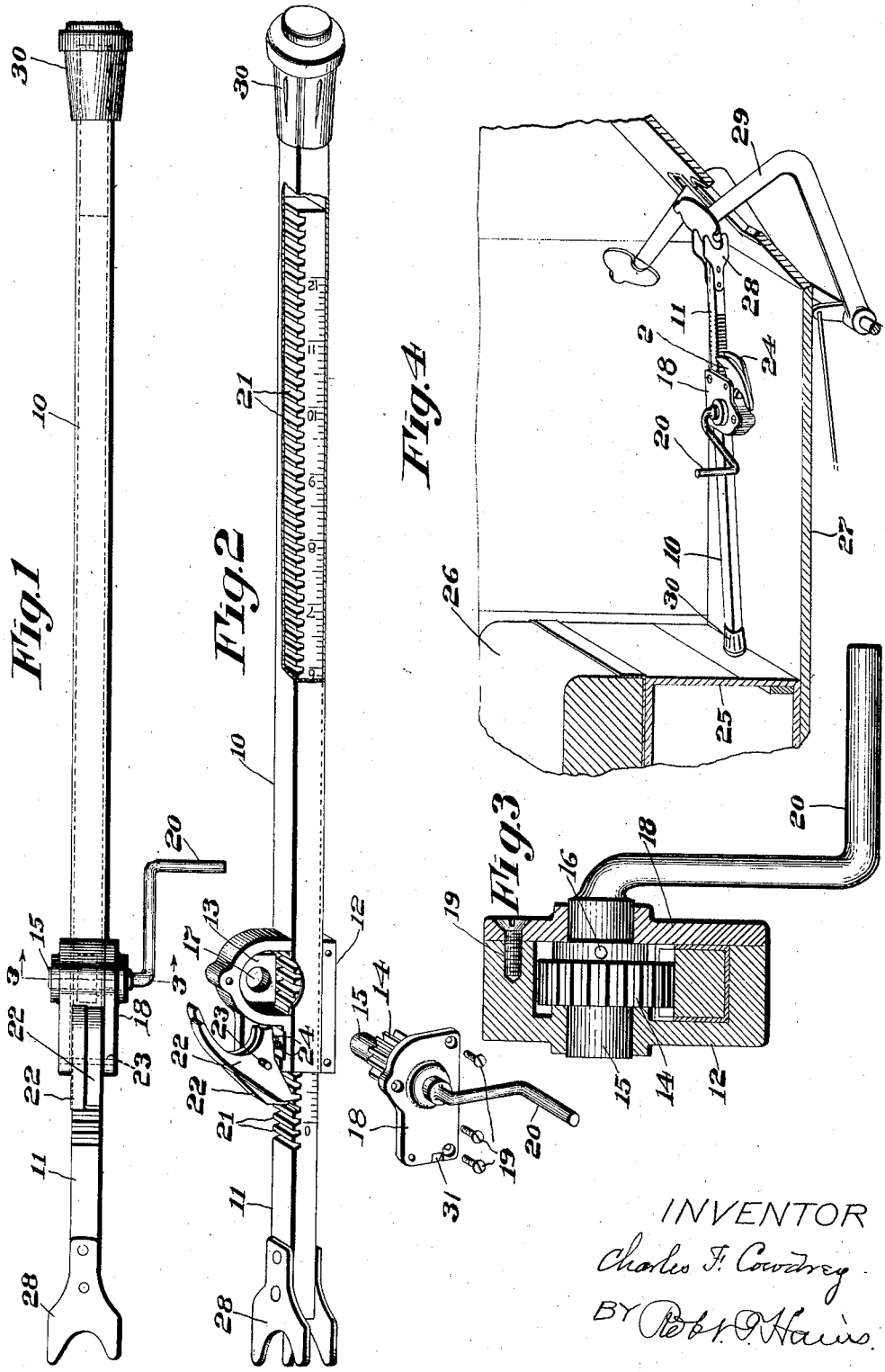
INVENTOR
Charles F. Cowdrey.
BY Robt. P. Harris
ATTORNEY Patented Jan. 25, 1927.

1,615,798

UNITED STATES PATENT OFFICE.

CHARLES F. COWDREY, OF FITCHBURG, MASSACHUSETTS, ASSIGNOR TO MUTHER MANUFACTURING COMPANY, OF BOSTON, MASSACHUSETTS, A CORPORATION OF MASSACHUSETTS.

PEDAL DEPRESSOR.

Application filed February 2, 1925. Serial No. 6,283.

This invention relates to a pedal depressor for holding the brake pedal of an automobile depressed while the brakes are being tested.

The condition of the brakes of an automobile are commonly tested by jacking up the rear wheels of an automobile and then one person holds the brake pedal depressed while a second person turns first one wheel and then the other under brake resistance to determine whether the brake action on the opposite wheels is approximately the same.

This practice not only requires the service of two persons, but is inaccurate, because the person holding the pedal depressed unconsciously varies the pressure upon the pedal during the testing of the opposite wheels.

To overcome this difficulty, one form of means for holding the pedal depressed while the brakes of an automobile are being tested is shown, described and claimed in the Charles F. Cowdrey United States Patent No. 1,448,912, granted March 20, 1923. The pedal depressor of this patent, while a good construction, is open to the objection that it can not be readily used upon all types of automobiles.

The present invention is therefore directed to an improved type of pedal depressor which may be used in all makes of automobile to hold the foot pedal depressed, and which is constructed to extend from the floor of the automobile at the base of the driver's seat to the pedal, and may be adjusted to depress the pedal any desired amount.

Important features of the pedal depressor of the present invention reside in a hollow column in which a bar is slidably mounted for telescopic adjustment; a rack and gear for adjusting the bar lengthwise of the hollow column, and a pair of dogs that cooperate with the rack to hold the bar in its different positions of adjustment; a cup-shaped socket fitted over the lower end of the column to provide a pad at this end; and graduations for indicating the adjustment of the rod lengthwise of the column and the amount of movement imparted to a pedal in depressing the same.

Other features of the invention and novel combination of parts in addition to the above will be hereinafter described in connection with the accompanying drawings which illustrate a good practical form of the invention.

In the drawings:—

Fig. 1 is a side elevation of the pedal depressor of the present invention;

Fig. 2 is a perspective view of the pedal depressor, with part of the gear casing removed.

Fig. 3 is an enlarged sectional view on the line 3—3 of Fig. 1; and

Fig. 4 is a perspective view of a portion of an automobile showing the pedal depressor in use.

In the embodiment of the invention shown, the pedal depressor is provided with a hollow column 10 in which is slidably mounted the bar 11, and both the column and bar are preferably approximately square in cross-section, to prevent the bar from rotating in the column.

Means is provided for adjusting the bar 11 telescopically within the column 10 and to this end the upper end of the column is provided with a casing 12 which may be soldered, braised or otherwise rigidly secured to the column 10; the casing is provided with an enlarged portion in which is formed a gear receiving opening 13 in which the gear 14 rotates. This gear is rigidly secured to the shaft 15 by a pin 16 which may extend thru a shoulder upon the gear and thru the shaft. One end of the shaft 15 is journaled in an opening 17 formed in the casing 12, and the other end of the shaft is journaled in an opening formed in the cover plate 18, which plate is secured to the casing by screws 19. The shaft 15 and gear secured thereto are rotated by the crank handle 20.

The teeth of the gear 14 engage the teeth of the rack 21 formed in one face of the bar 11, and the arrangement is such that as the crank handle 20 is rotated the bar 11 will be adjusted lengthwise of its supporting column 10. Means is desired for securing the shaft 11 in its different positions of adjustment, and to this end the casing 12 is provided with a pair of dogs 22 pivotally supported by the pin 23, the ends of which pins extend into the opposite walls of the casing 12. The rack-engaging portion of one dog 22 is positioned the space of half a tooth in advance of the rack-engaging end of the other dog. The object of providing two dogs, one of which is spaced slightly in front of the other, is to cause one dog to enter the space between two teeth of the rack, while the other dog is sliding over a tooth, whereby one of the dogs is always in position to engage the rack and hold it in any position of adjustment. The use of two dogs positioned as described has the further advantage that the rack may be secured in any position of adjustment equal to half the space between adjacent teeth of the rack. The dogs 22 are urged towards the rack-engaging position by the springs 24 and they may be rocked out of engagement with the rack by exerting a pressure upon the outer ends of the dogs.

When the pedal depressor is employed to hold the brake pedal of an automobile depressed, the outer end of the hollow column 10 is placed so that it will rest against the front portion 25 of the driver's seat 26, where this front portion meets the floor 27 of the automobile, as will be apparent from Fig. 4. The outer end of the bar 11 is provided with a fixed head 28 having a notch which is adapted to engage an edge of the foot-engaging portion of the brake pedal 29 so that the pedal depressor extends in an inclined direction from the base of the front portion of the driver's seat to the pedal 29, as shown. The pedal 29 may be depressed any desired amount by rotating the crank handle 20 to adjust the bar 11 telescopically within the column 10, and the dogs 22 serve to hold the bar 11 in any desired position of adjustment. It is desirable to prevent the end of the column 10 from injuring the portion of the automobile which it engages, and this is readily accomplished by providing the lower end of the column 10 with a cup-shaped pad 30 which may be formed of rubber or other resilient material, and may be easily inserted over the lower end of the column 10.

In testing the brakes of an automobile, it is often desirable to determine the force required to turn a wheel under brake resistance when the foot pedal has been depressed a predetermined amount, say, for example, three inches from its normal elevated position. It is therefore desirable to provide means for showing the amount of movement which has been imparted to the bar 11 in depressing the pedal 29. To this end a graduated scale is provided along one face of the bar 11, as clearly shown in Fig. 2, and the outer face of the cover plate 18 may be notched as at 31 to enable the graduation of the scale adjacent the upper end of the column 10 to be readily noted. Thru the provision of th graduations the adjustment of the bar 11 can be at all times accurately determined, and as a result the amount a pedal is depressed during a particular test may be readily noted, as may also the effect upon the brakes produced by depressing the pedal different amounts.

The present device, while inexpensive to manufacture, is strong and durable, and may be readily placed in any type of automobile, with one end engaging the front portion of the driver's seat where it meets the floor, and the other end engaging the foot pedal to hold the latter depressed; and since one adjustable bar is mounted telescopically within the other and the head 28 at the end of the bar 11 lies in axial alignment with the bars, the pedal depressing force is exerted axially of the pedal depressor throughout its length, thus relieving the parts of the same from lateral strains.

What is claimed is:—

1. A device for holding the foot pedal of an automobile depressed, comprising in combination, a hollow column having a gear casing at one end and a cup-shaped flexible pad fitted over its opposite end, a bar slidably mounted in the hollow column for telescopic adjustment and provided with rack teeth, a head at the outer end of said bar and provided with a transversely extending notch adapted to receive an edge of the pedal to be depressed, a gear rotatably mounted in said casing in engagement with the teeth of said rack to move the bar lengthwise of said column, means for rotating said gear, a pair of dogs positioned one in advance of the other to engage the teeth of the rack and hold the bar in different positions of adjustment within the column, and graduations along said bar for indicating its adjustment within the column.

2. A device for holding the foot pedal of an automobile depressed, comprising in combination, a hollow column formed of tubular metal that is square in cross section, a bar of stock metal that is square in cross section slidably mounted in the column for telescopic adjustment therein, a head at the outer end of said bar and formed of metal plates rigidly fastened to the opposite flat faces of said bar and provided with aligned notches adapted to receive an edge of the pedal to be depressed, teeth formed along one face of said bar, means engageable with the teeth to move the bar telescopically within said column, and means for holding the bar in its different positions of adjustment longitudinally of the column.

3. A device for holding the foot pedal of an automobile depressed, comprising in combination, a hollow column having a gear casing at one end and a soft pad at its opposite end, a bar slidably mounted in the hollow column for telescopic adjustment therein and provided with rack teeth, a head at the outer end of said bar provided with a notch adapted to receive an edge of the pedal to be depressed, a gear rotatably mounted in said casing in engagement with the teeth of said rack to move the bar lengthwise of said column, a handle for rotating said gear, and a dog engageable with said teeth to hold the bar in different positions of adjustment within the column.

In testimony whereof, I have signed my name to this specification.

CHARLES F. COWDREY.